No. 648,791. Patented May 1, 1900.
H. RAYNAL.
APPARATUS FOR CUTTING PATTERN STENCIL PLATES.
(Application filed Jan. 23, 1899.)
(No Model.) 2 Sheets—Sheet 1.
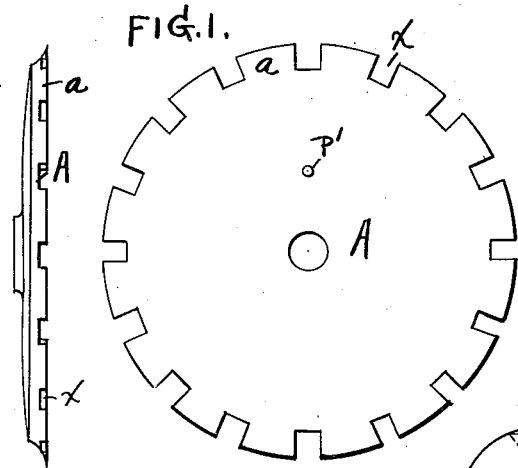
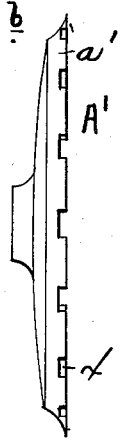
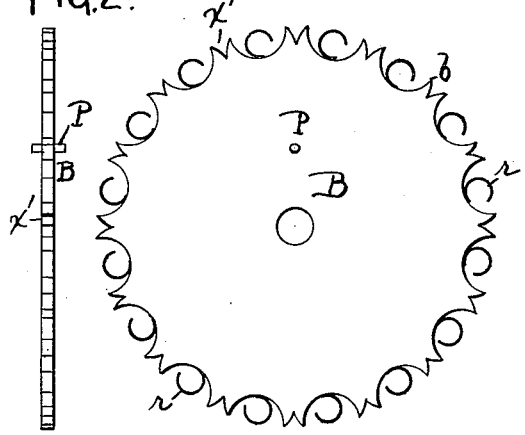
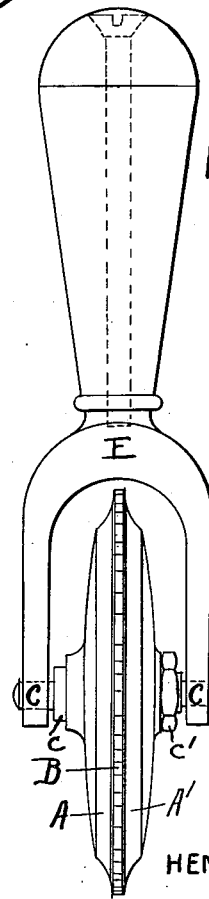
INVENTOR
HENRI RAYNAL
BY
Howson and Howson
HIS ATTORNEYS
WITNESSES:

No. 648,791.  
H. RAYNAL.  
Patented May 1, 1900.
APPARATUS FOR CUTTING PATTERN STENCIL PLATES.
(Application filed Jan. 23, 1899.)
(No Model.)  
2 Sheets—Sheet 2.
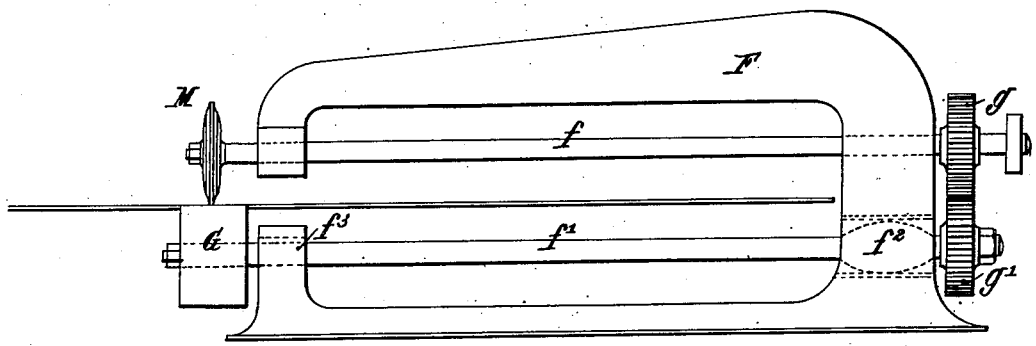
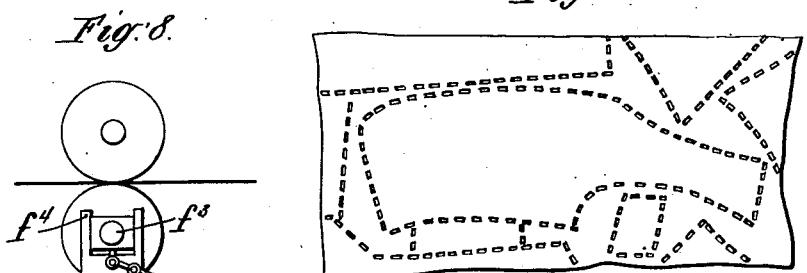
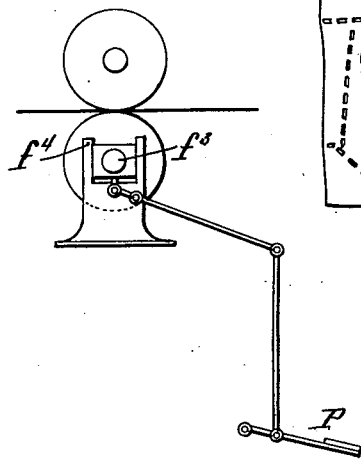
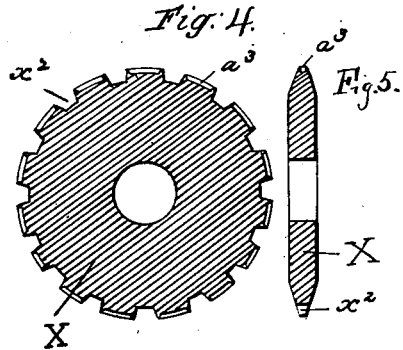
WITNESSES:  
F. W. Wright  
V. F. Lake.
INVENTOR  
HENRI RAYNAL  
BY  
Howson and Howson  
HIS ATTORNEYS.

UNITED STATES PATENT OFFICE.

HENRI RAYNAL, OF LILLE, FRANCE.

APPARATUS FOR CUTTING PATTERN STENCIL-PLATES.

SPECIFICATION forming part of Letters Patent No. 648,791, dated May 1, 1900.

Application filed January 23, 1899. Serial No. 703,135. (No model.)

*To all whom it may concern:*

Be it known that I, HENRI RAYNAL, of Lille, Department of Nord, France, have invented certain new and useful Improvements in Apparatus for the Manufacture of Stencil-Plates for Making Patterns for Garments and the Like, of which the following is a specification.

This invention relates to a milled cutter intended for the production of perforated plates for stenciling patterns for dresses, undergarments, boot and shoe uppers, and the like. This milled cutter consists in principle of a series of punches arranged circularly, the cutting edges of which are separated by intervals corresponding to the full portions of the stencil-plate.

In order that my invention may be readily and clearly understood and also the means for carrying it into practice, I have represented in the accompanying drawings two constructional forms of milled cutters constructed in accordance with my invention.

In the accompanying drawings, Figure 1 is a face view of one of the side disks of my improved cutter. Fig. 1$^a$ is a side view thereof. Fig. 1$^b$ is a view similar to Fig. 1$^a$, but particularly designed for the disk on that side of the center disk away from the nut of the hand-tool. Fig. 2 is a face view of the central disk. Fig. 2$^a$ is a side view of Fig. 2. Fig. 3 illustrates a cutter operated by hand. Fig. 4 is a sectional face view of a modified cutter. Fig. 5 is a sectional side elevation through the perpendicular center line of Fig. 4. Fig. 6 represents a portion of a plate after being perforated by my cutter. Fig. 7 is a side elevation of a machine for operating my improved cutter, and Fig. 8 is an end view of part of Fig. 7, showing the means for pressing the plate against the cutter.

The milled cutter represented in Figs. 1 to 3 consists of three disks, two of which, A and A', are practically similar, and between these is arranged the third or central disk B, Fig. 2. The outer disks A A' are provided upon their peripheries with a series of cutting-teeth $a$ $a'$, the cutting edge of which is curved concentrically with the axis of the disk, but tangential to a line at right angles to said axis. The central disk B is also provided with cutting-teeth $b$, but the cutting edge of these is parallel with the axis of the disk. These teeth $b$ are separated one from the other alternately by an interval $x'$ corresponding to an interval $x$ of the disks A and A'. These disks are kept in proper relation to each other by a pin $p$ and holes $p'$, as will be readily understood. The three disks are mounted upon an axle C, Fig. 3, common to them all, and held tightly together between a collar $c$ upon the said axle and a nut $c'$ in such a manner that the teeth of the disks A A' are opposite one to the other and that the teeth $b$ of the central disk B are arranged at the extremities of the teeth $a$ $a'$ of the outer disks A A'. The cutting edges of the central disk B are arranged at the extremities of the teeth $a$ $a'$ of the outer disks A A'. The cutting edges of the central disk $b$ being at right angles to the cutting edges of the outer disks $a$ $a'$, a series of rectangular punches is obtained, each of which is of the length of the teeth $a$ $a'$ of the said outer disks and of the width of the teeth $b$ of the inner disk. Springs $r$, fixed upon the periphery of the central disk B between the teeth $b$, which are separated by the greatest interval, serve to force out of the punches the pieces of paper cut out by these latter. This arrangement of a milled cutter consisting of several dismountable disks presents the important advantage of enabling the cutting edges to be set when the punches become blunted. For this purpose it is only necessary to dismount the disks and sharpen the cutting edges separately. In this modification $a^3$ represents the cutting-openings of rectangular shape. $x^2$ is the interval between them, while X is the body of the cutter. It should, however, be understood that I do not limit myself to forming my cutters of separate disks, as described; but that I reserve the right to form my cutters in a single piece, as shown in Figs. 4 and 5, retaining, however, the same arrangement of cutting-punches around the periphery of the disk.

Whatever the constructional form adopted, the cutter may be mounted in a fork, provided with a handle E, Fig. 3, or upon the shaft of a suitable machine, to which shaft a movement of rotation is imparted. (See Figs. 7 and 8.)

In order to form a perforated plate by means of a cutter mounted upon a handle, the outlines of the pattern which it is desired to form are first of all traced upon paper or tissue of any suitable kind. This paper or tissue is then placed upon a table of hard wood or upon a sheet of soft metal and the outlines of the pattern are followed with the cutter, while exerting a slight pressure with the hand. There is thus obtained by the use of the cutter of the first type a plate having elongated rectangular perforations. (See Fig. 6.) These elongated perforations present the advantage of enabling the cloth upon which the pattern is to be traced to be reached by means of a pad charged with coloring-matter when the plates are used for marking patterns for costumes.

As above specified, the perforation of the plate may equally well be effected by machinery. For this purpose the cutter may be mounted upon the extremity of a shaft $f$, Fig. 7, which is capable of rotation in a frame F. The shaft $f$ communicates the rotation, which is imparted to it in any convenient manner by means of gear-wheels $g\ g'$, to another parallel shaft $f'$, which carries at its extremity opposite the cutter M a roller G. At the place at which the shaft $f'$ traverses the rear portion of the frame (at $f^2$) it is made olive-shaped, and its bearing $f^3$ is guided in a fork $f^4$ of the frame in such a manner as to be capable of vertical displacement with respect to this latter by means of a pedal P and a system of levers, Fig. 8. In order to perforate a plate which has been previously outlined, it is passed between the cutter M and the roller G, which are normally separated, the frame F being open at the side for the free insertion of the plate, as shown in Fig. 7. The pedal P is then acted upon in such a manner as to raise the roller G and by its means to slightly press the plate against the cutter M. Any other suitable arrangement may, however, be employed.

I claim as my invention—

1. A circular cutter for perforating stencil-plates having cutting edges substantially parallel with the axis of the cutter and other edges in planes substantially at right angles thereto, and curved concentrically with the axis, leaving perforating-openings bounded by said edges, substantially as described.

2. A circular cutter for perforating stencil-plates composed of disks, some of which have cutting edges substantially parallel with the axis of the cutter and some in planes substantially at right angles thereto, and curved concentrically with said axis, leaving perforating-openings bounded by said edges, substantially as described.

3. A circular cutter for perforating stencil-plates composed of disks, some of which have cutting edges substantially parallel to the axis of the cutter and some substantially at right angles thereto, leaving openings bounded by these edges, and springs in said openings, as and for the purpose described.

4. Apparatus for perforating stencil-plates for marking garments, consisting of a frame open at the side for the free insertion of the plate, rotating shafts, geared together at one end a circular cutter provided with punches and carried on the outer end of one shaft at the open side of the frame and a roller on the corresponding end of the other shaft, and one shaft being mounted at its geared end in an oval bearing so as to permit vertical displacement of its outer end, in combination with means for causing the roller to bear on the cutter, when desired, substantially as described.

In testimony whereof I have signed my name to this specification in the presence of two subscribing witnesses.

HENRI RAYNAL.

Witnesses:
 DAVID OGILVIE,
 GASTON VIAULE.